US006944446B1

(12) United States Patent
Kubler et al.

(10) Patent No.: US 6,944,446 B1
(45) Date of Patent: Sep. 13, 2005

(54) SYSTEM FOR DYNAMIC TIME DIVISION MULTIPLE ACCESS TO ALLOW ITS PROPER FUNCTIONING IN A RADIO FREQUENCY OR WIRELESS NETWORK

(75) Inventors: Joseph J. Kubler, Boulder, CO (US); Patrick W. Kinney, Export, PA (US)

(73) Assignee: Intermec IP Corp., Everett, WA (US)

( * ) Notice: Subject to any disclaimer, the term of this patent is extended or adjusted under 35 U.S.C. 154(b) by 347 days.

(21) Appl. No.: 10/237,248

(22) Filed: Sep. 6, 2002

Related U.S. Application Data

(63) Continuation-in-part of application No. 10/050,062, filed on Jan. 15, 2002, now abandoned.

(60) Provisional application No. 60/261,771, filed on Jan. 15, 2001.

(51) Int. Cl.[7] .................................................. H04Q 7/20

(52) U.S. Cl. .................. 455/422; 455/452; 455/452.1; 370/328

(58) Field of Search .......................... 455/422.1, 452.1, 455/509, 517, 422, 452; 370/328

(56) References Cited

U.S. PATENT DOCUMENTS 6,034,951 A * 3/2000 Du .............................. 370/328
6,711,403 B1 * 3/2004 Herrmann et al. ....... 455/422.1
6,747,976 B1 * 6/2004 Bensaou et al. ......... 370/395.4

* cited by examiner

*Primary Examiner*—Nick Corsaro
*Assistant Examiner*—Chuck Huynh

(57) ABSTRACT

Should a station not require its allocated transmission slot, another station may detect that cessation during a "mini-slot" and start its transmission. For example, to prevent a station from incorrectly perceiving a mini-slot;

1) each station must periodically send a message to the media coordinator to which the coordinator will respond, and any station not hearing the message from the requesting station, but hearing the response from the coordinator must drop out; or
2) the stations could send a request to send (RTS) to the media coordinator, which would send a clear to send (CTS), and only then would the station send its data. All stations in the network system would hear one or the other. The mini-slot would need to be of sufficient duration to have the RTS/CTS exchange. In addition, this last way allows peer to peer connectivity in general (unrelated to whether or not one is using some dynamic TDMA type of service).

3 Claims, 4 Drawing Sheets

SYSTEM FOR DYNAMIC TIME DIVISION MULTIPLE ACCESS TO ALLOW ITS PROPER FUNCTIONING IN A RADIO FREQUENCY OR WIRELESS NETWORK

CROSS REFERENCE TO RELATED APPLICATIONS

The present application is a continuation-in-part of application Ser. No. 10/050,062 filed Jan. 15, 2002, now abandoned which claims the benefit of provisional application No. 60/261,771 filed Jan. 15, 2001, both application No. 10/050,062 and application No. 60/261,771 being incorporated herein by reference in their entireties including drawings, and incorporated material.

BACKGROUND OF THE INVENTION

The purpose of this invention is to allow a system called Dynamic Time Division Multiple Access (D-TDMA) as hereafter described in this Background section to properly function in a radio frequency or other wireless network.

One of the goals of asynchronous data communication is to maximize the use of the available bandwidth on media by allocating bandwidth on a "first come, first served basis". This trait is especially valuable in a wireless radio frequency network where bandwidth can be hard to obtain. Another advantage of this method is that it typically provides low latencies of communications when the media use is not high. A deficiency of asynchronous communication is that while it can provide a "best effort" towards routing packets to their desired destination, it cannot provide a guaranteed level of service i.e. a commitment that a packet will arrive at the desired station within a given timeframe.

A TDMA protocol can be used to provide a guaranteed level of Quality of Service (QoS) by allocating communications link time to particular stations rather than by allocating bandwidth on a "first come, first served basis". FIG. 1 shows an example of a "superframe" made up of seven slots dedicated to particular stations. The beacon is a slot reserved for the media coordinator to synchronize all station's clocks and to advise all stations of the media allocation schedule. The problem with this protocol is that it is not spontaneous and dynamic, i.e. it requires the users to set up a service schedule with the media coordinator prior to their usage and requires the users to advise the media coordinator when the service is not required. Since the actual bandwidth requirements of many stations cannot be known in advance, a station is forced to request a "worst case" estimation of bandwidth required, i.e. the largest amount that it might need. This practice leads to inefficient use of bandwidth.

The intent of a D-TDMA algorithm is to provide the high Quality of Service (QoS) of the TDMA protocol to a communications link while providing a mechanism to use excess instantaneous bandwidth. In this manner time bounded allocations of bandwidth are made to stations to support their necessary QoS levels. Should a station not required the level of bandwidth allocated it will cease transmission and another station may detect that cessation and start its transmission earlier than its allocation. In this manner excess bandwidth is not "wasted" due to non-use by the allocated station. The details of this detection is to observe the media for activity, if it has been inactive for an amount of time named a "mini-slot" it will deem the media available for its use. FIG. 2 illustrates this concept. In this example the station which was allocated slot 2 did not need the full time slot so it ceased transmission. Another station sensed this vacancy after a mini-slot and used up the remaining time designated as slot 2*a*.

SUMMARY OF THE INVENTION

This D-TDMA algorithm requires all participating stations to be able to detect and decode all transmissions on the media. If a station cannot detect or properly decode all transmission it will degrade or destroy the QoS levels required by other stations. This degradation occurs since the inability to detect or decode will lead the station to believe that it has sensed a mini-slot and will then start to transmit despite another station's use of the media, i.e. a "collision" will occur. This collision will result in transmission errors to both transmissions resulting in their loss of communication for that interval. The inability to detect a transmission might be as a result of the "hidden node" scenario as depicted in FIG. 3. In this scenario a station may be able to detect and decode one or more participating stations but cannot detect or properly decode a station(s) due to insufficient signal strength caused by excessive distance or localized interference. For example, in FIG. 3 station A has reserved bandwidth with the coordinating station C to send time bounded data to station B. Station D now determines that it desires to send data to terminal E. Furthermore station D cannot detect or properly decode the signal from station A (i.e. it's a hidden node). When station D senses the media while station A is transmitting it will sense a "clear" state i.e. it won't detect signal transmission. It will then transmit at the same interval as station A, corrupting the data stream that stations B and E receive. The hidden node scenario can be a very typical occurrence in a radio frequency network.

The improvement to D-TDMA consists of four possible solutions:

(1) Include a short period for TDMA composed of a single slot for each station participating in the D-TDMA. This period is illustrated in FIG. 4 as occurring after the beacon and at the beginning of the Contention Access Period. Any station wishing to participate in the D-TDMA must transmit a message in their TDMA slot. In addition this station must also detect all other station's data in their TDMA slots. This precludes stations that are no longer able to detect and decode, i.e. no longer fully connected in the radio network, from damaging the service of others.

(2) Each station using D-TDMA must periodically send a message to the media coordinator (the station that allocates time in the QoS period) to which the coordinator will respond. These transactions in the preferred embodiment would occur during the Contention Access Period as depicted in FIG. 4. Any station not hearing the message from the requesting station, but hearing the response from the coordinator must drop out as in (1) above.

(3) All stations wishing to use D-TDMA must verify full connectivity with all other users of this service before it can it join this operation. Each station using D-TDMA verifies that its service level is being met, i.e. not disrupted for some reason (most likely by a station no longer fully connected). If the service level is not met, the station informs the coordinator. The coordinator will force all stations using QoS to verify that they are still fully connected. If not, the non-fully connected stations will drop out.

(4) Another way is a novel application of an existing concept. The stations using D-TDMA could always send a request to send (RTS) to the media coordinator, which would send a clear to send (CTS). Only then would the station send its data. In FIG. 5 the dashed lines illustrate when the stations would send the RTS. All stations using D-TDMA would hear one or the other. The mini-slot would need to be of sufficient duration to have the RTS/CTS exchange, and full connectivity would be maintained in this way. RTS/CTS has been disclosed previously, but as a two station solution and not using a three station solution. In addition, this last way allows peer to peer connectivity in general (unrelated to whether or not one is using some D-TDMA type of service).

Since each of the four proposed solutions paragraphs (1) through (4) above has some deficiencies it is further proposed that a better embodiment of this invention is to combine two or more of the proposed solutions. In the preferred embodiment, solution four, paragraph (4) above, which exhibits well controlled behavior as respect to the hidden node scenario but has the deficiency that the media controller must always be detecting all station transmissions, would be used by the network when power was abundantly supplied to the media controller. But if and when the media controller would be required to exhibit power management the network would revert to solution three, paragraph (3) above. On this manner the network would exhibit the best behavior given the circumstances of the media controller.

DETAILED DESCRIPTION

Figure 1:
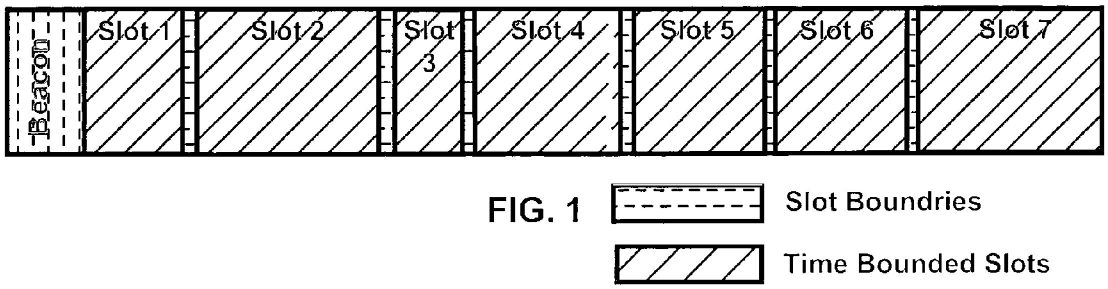
FIGS. 1 and 1A illustrate a "superframe" in a TDMA protocol.
Figure 2:
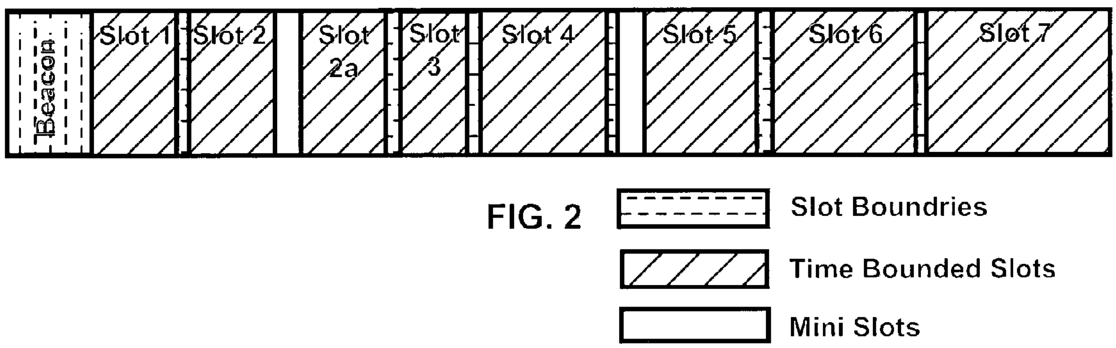
FIGS. 2 and 2A show the concept of a dynamic TDMA protocol, to which the improvements of the present invention may relate.

FIGS. 1 and 2 are described in the BACKGROUND OF THE INVENTION.

Figure 1A:
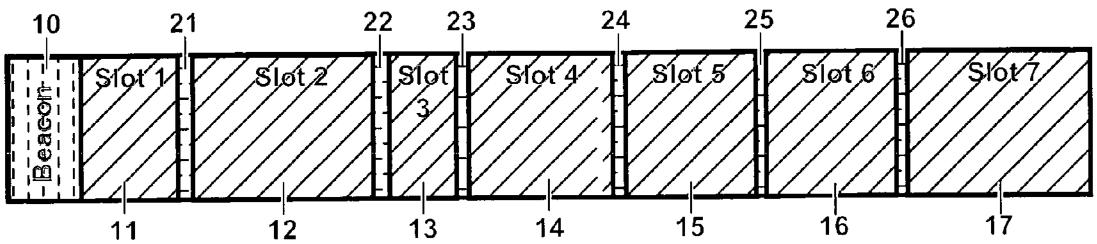

FIG. 1A designates the beacon transmission interval at 10, the time bounded slots at 11–17 for the case of seven stations associated with the coordinating station, and slot boundaries at 21–26.

Figure 2A:
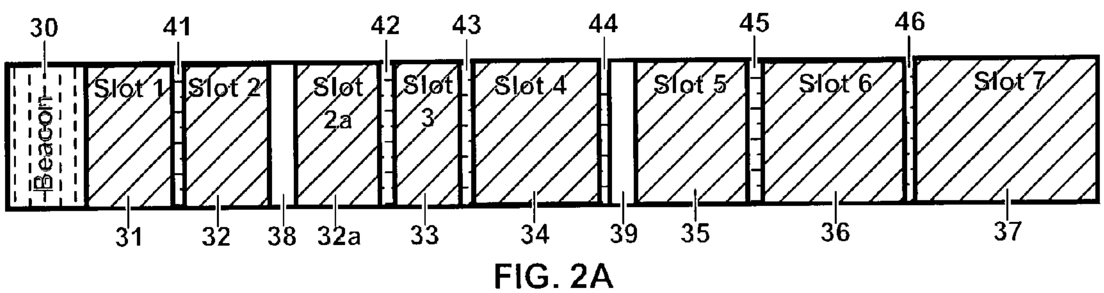

FIG. 2A designates the beacon interval as 30, and time bounded slots as 31, 32–32*a,* and 33–37, with "mini slots" shown at 38 and 39, and slot boundaries at 41–46.

Figure 3:
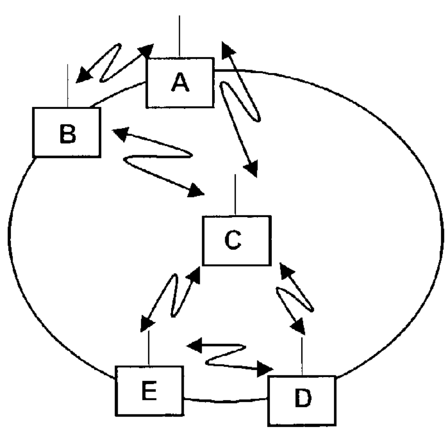
FIGS. 3 and 3A illustrate the problem of a "hidden node" for the protocol of FIGS. 2 and 2*a*.
Figure 4:
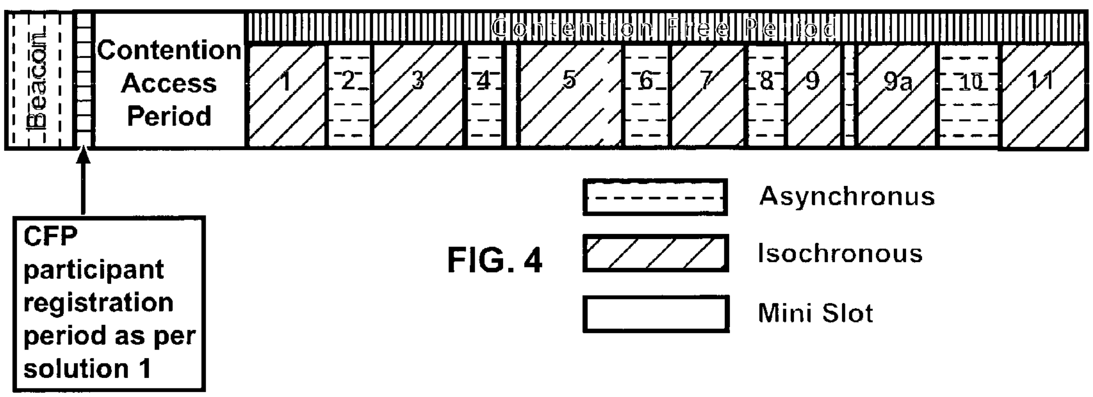
FIGS. 4 and 4A are used for explaining three possible solutions according to the present invention for the "hidden node" problem.
Figure 5:
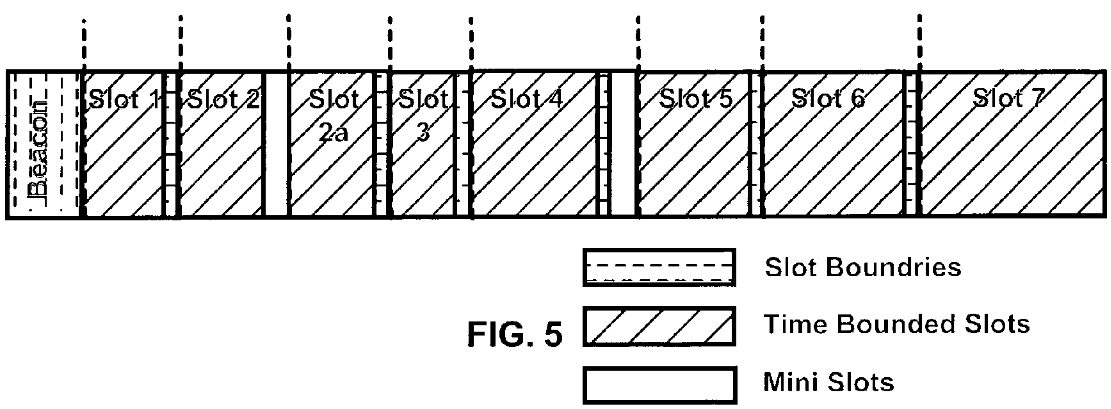
FIGS. 5 and 5A illustrate a fourth solution according to the present invention for the "hidden node" problem.

FIGS. 3, 4 and 5 are described in the SUMMARY OF THE INVENTION. In FIG. 4, "CFP" stands for Contention Free Period.

Figure 3A:
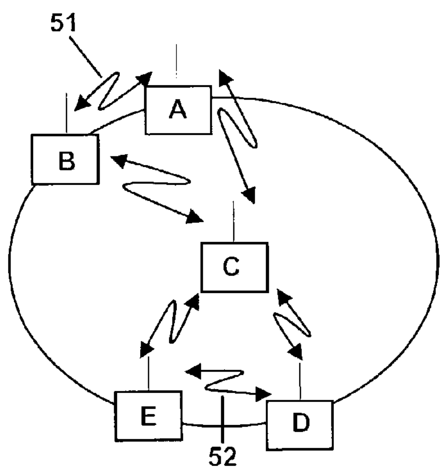

FIG. 3A indicates a station A sending time bounded data to station B by the path represented by double headed arrow 51, while an interfering transmission occurs from station D to station E via the path as indicated at 52 because of station D being unable to detect the transmission at 51.

Figure 4A:
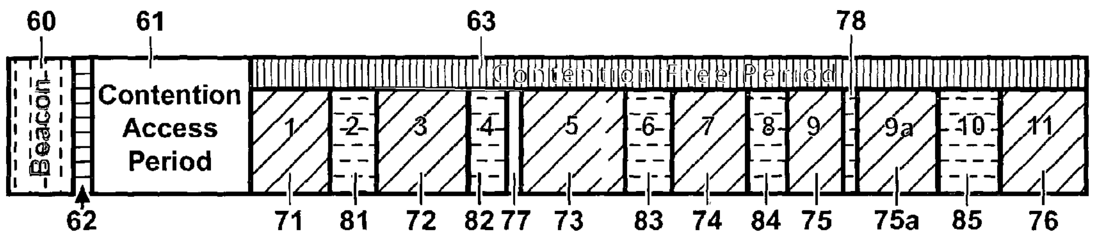

FIG. 4A designates a beacon transmission period 60, a contention access period at 61, and contention free periods at 62 and 63. The period 62 serves as a participant registration period for solution one (1) as heretofore described. Participant stations such as A, B and D, E in FIGS. 3, 3A, are required to register in the registration period 62, in respective short time interval slots successively following each other in time. In addition, each station must detect the registration messages during period 62 of all other participants, before it may participate in the D-TDMA communication process. Isochronous slots are indicated at 71–74, 75, 75*a,* and 76. Mini-slots are indicated at 77 prior to isochronous slot 73, and at 78 prior to slot portion 75*a.* In FIGS. 4 and 4A, slots 81–85 may provide intervals for asynchronous communication by respective assigned stations.

Figure 5A:
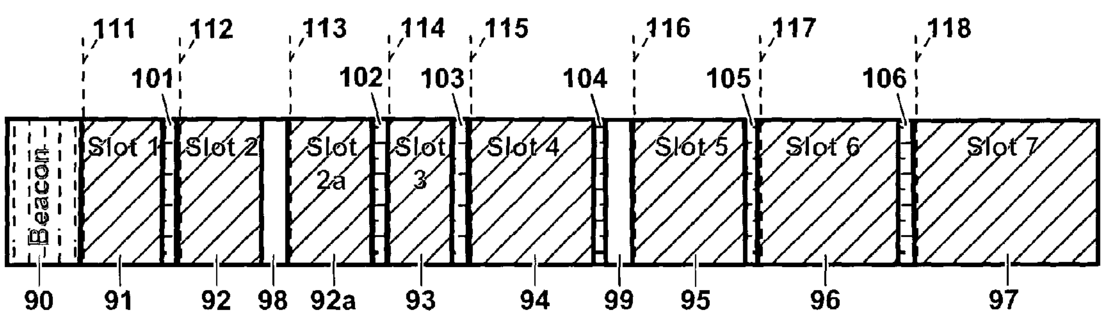

FIG. 5A shows a beacon interval at 90, time bounded slots at 91, 92, 92*a,* and 93–97, mini-slots at 98 and 99, and slot boundaries at 101–106. The required RTS/CTS exchanges for the station assigned to time bounded slots 91, 92, and 93–97, respectively, are to take place as indicated at 111, 112, and 114–118. A station wishing to use slot portion 92*a* would initiate an RTS/CTS exchange at 113.

As explained in the SUMMARY OF THE INVENTION, solution four (as illustrated in FIGS. 5 and 5A) would be a preferred embodiment when media controller C, FIGS. 3 and 3A, was connected to an abundant source of power. For example, the media controller C might be a handheld or other type of portable computer that could be placed in a vehicle dock or a stationary dock with an abundant source of power. The controller C could sense that it was connected to such a dock and accordingly operate according to solution four, and advertise that it was operating in solution four in its beacons that it would send periodically, so that terminals such as A, B, D, and E would operate according to FIG. 5A.

If at a later time, the media controller C was removed from a dock, and was required to operate on its own battery power, the media controller C in its beacons would signal the use of solution three as described above, whereupon each terminal such as A, B, D, and E would verify that it was fully connected in advance of participating in the D-TDMA process represented in FIGS. 2 and 2A.

The following U.S. patents assigned to the assignee of the present application are hereby incorporated herein by reference in their entireties including appendices and drawings and incorporated material:

U.S. Pat. No. 5,673,031 issued Sep. 30, 1997

U.S. Pat. No. 5,680,633 issued Oct. 21, 1997

U.S. Pat. No. 5,726,894 issued Mar. 10, 1998

U.S. Pat. No. 5,940,771 issued Aug. 17, 1999

U.S. Pat. No. 6,389,010 issued May 14, 2002

It should be understood that the embodiments of the present invention described hereinabove are merely illustrative and that modifications and adaptations including those based on the incorporated material, may be made without departing from the scope of the appended claims.

Further Discussion

Referring to FIG. 5A, it will be noted that a given station, e.g. station A, FIG. 3A, may initiate a communication with a station other than the media coordinator (e.g. station B) without dependence on first receiving a poll from the media coordinator, by sending a RTS, or preliminary, signal to the media coordinator at the beginning of its assigned time bounded slot (e.g. isochronous slot 91), as indicated at 111, or by sending a RTS, or preliminary, signal to the media coordinator e.g. at 113 or 116 after a respective mini-slot 98 or 99. In this secure, direct peer to peer messages can be initiated independent of slot assignment by the media coordinator, and independent of any prior action (such as a poll signal) by the media coordinator during a daytime TDMA "superframe" such as shown in FIG. 5A. Also during direct peer to peer communications, e.g. in 802.11 type networks, including the present draft of 802.11c, where a CDMA approach is used but which prioritizes its access by modifying an initial "listen before talk" interval time, the procedure of initiating direct peer to peer communication by sending a preliminary signal to the media coordinator, and awaiting a response signal from the media coordinator of strength to be heard by all stations permitted on the network, would be advantageous.

We claim as our invention:

1. In a wireless network including at least three wireless stations, the method of controlling communication wherein a first wireless station desiring to communicate with another wireless station of the network, transmits a preliminary signal, to a second wireless station of the network, the second wireless station upon receiving the preliminary signal, sending a response signal of strength to be received by both a third of the wireless stations and the first wireless station, the third wireless station refraining from sending its own preliminary signal upon receiving the response signal even though the third station failed to receive the preliminary signal from the first station, and said first wireless station sending its communication directly to a wireless station other than said second wireless station upon receiving said response signal from the second wireless station.

2. The method of claim 1, wherein the first wireless station is assigned a time slot for transmitting a message, and before sending the message, sends the aforesaid preliminary signal, and awaits the response signal from the second wireless station.

3. The method of claim 1, wherein the first wireless station, before sending a peer to peer message in an isochronous time slot, sends the aforesaid preliminary signal, and awaits the response signal from the second wireless station.

* * * * *